March 24, 1942. D. C. SHARP ET AL Re. 22,054

SLUSH PUMP PISTON

Original Filed Nov. 29, 1935 2 Sheets-Sheet 1

Inventor

DUDLEY C. SHARP
RANALD M. GARRISON.

By Jesse R. Stone
Lester B. Clark

Attorneys.

March 24, 1942. D. C. SHARP ET AL Re. 22,054

SLUSH PUMP PISTON

Original Filed Nov. 29, 1935 2 Sheets-Sheet 2

Inventor
DUDLEY C. SHARP.
RANALD M. GARRISON.
By Jesse R. Stone
Lester B. Clark
Attorneys.

Reissued Mar. 24, 1942 Re. 22,054

UNITED STATES PATENT OFFICE 22,054

SLUSH PUMP PISTON

Dudley C. Sharp and Ranald M. Garrison, Houston, Tex., assignors to Mission Manufacturing Company, Houston, Tex., a corporation of Texas Original No. 2,189,839, dated February 13, 1940, Serial No. 52,086, November 29, 1935. Application for reissue January 21, 1941, Serial No. 375,339

9 Claims. (Cl. 309—23)

The invention relates to an improvement in slush pump pistons of the type which are used in maintaining a circulation of the slush, drilling mud, or fluid in the rotary system of drilling wells.

Slush pump pistons of this type are subjected to pressures of several thousand pounds per square inch on the working stroke and to a suction or somewhat of a vacuum on the return stroke so that it seems obvious that they must be constructed to withstand enormous stresses and reversal of pressures as well. These pistons operate at a relatively high rate of speed in a close fitting liner with a highly abrasive liquid as the only lubricant.

It is one of the objects of the invention to provide a piston wherein the parts which are subjected to wear are readily replaceable.

Another object of the invention is to provide a hub and flange construction for a slush pump piston upon which a snap ring and a flexible packing may be mounted or removed without removing the hub from the rod or liner.

Another object of the invention is to provide a packing element for slush pump pistons which will be held in position so that it may seal against the liner when subjected to pressure and draw away from the liner when subjected to suction.

Another object of the invention is to provide a packing element for slush pump pistons which is held in position on the piston body so that it may draw away from the liner on the suction stroke to eliminate wear and flex back against the liner on the pressure stroke in order to provide a seal.

It is also an object of the invention to provide an excess pressure area to receive the packing as it flows from its normal position due to either pressure or suction.

Another object of the invention is to provide a packing member for slush pump pistons which is securely confined in operating position but which is capable of limited movement in order to accommodate itself to the pressure and suction applied thereto.

Another object of the invention is to provide a packing element in combination with a supporting structure wherein a holding plate and clamping ring are provided to hold the packing in position.

A still further object of the invention is to provide a packing element which is clamped in position on the supporting structure in such a manner that expansion or sealing of the packing member can be accommodated without affecting the operating of the piston.

It is also an object of the invention to provide a clamping plate for slush pump piston body which supports the packing at one point and allows it to flex at another point.

Another object of the invention is to reenforce the resilient material adjacent the area of greatest pressure so that it will be restrained from undue expansion.

Other and further objects of the invention will be readily apparent when the following description is considered in connection with the accompanying drawings wherein.

Figure 1:
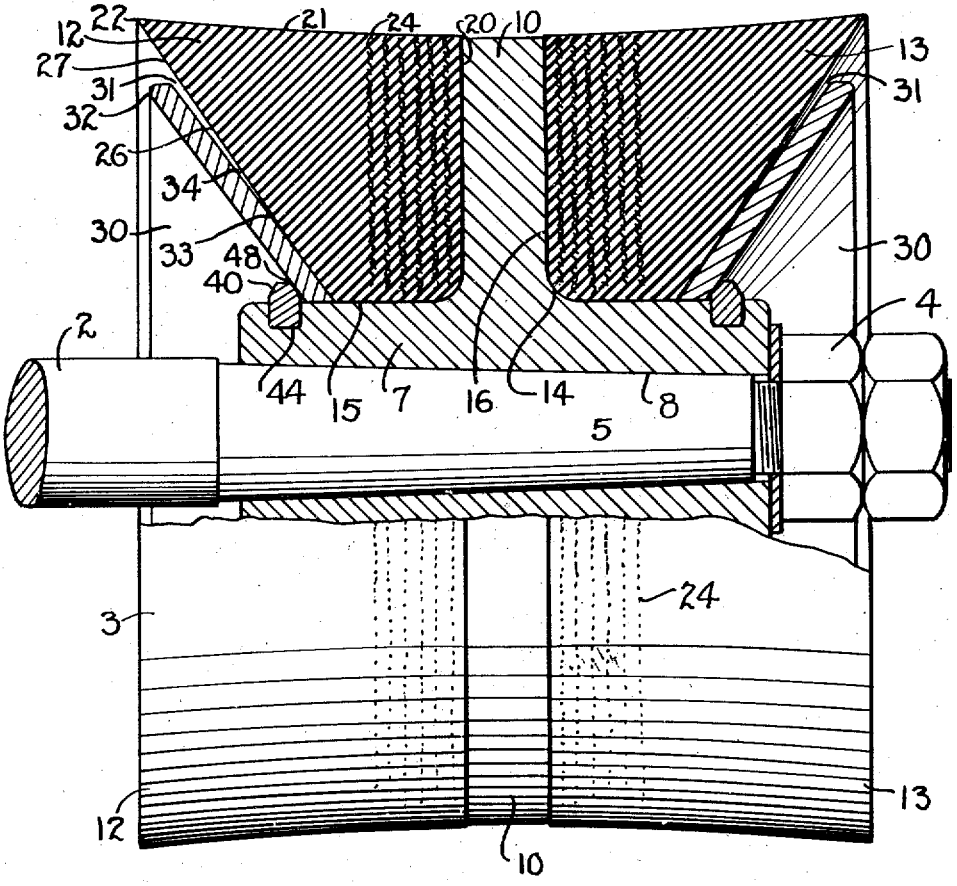
Fig. 1 is a side elevation of a slush pump piston arranged on its supporting rod with certain parts shown in section to illustrate the construction and arrangement thereof.

Slush pumps of the general type now in use embody a rod 2 which is reciprocated by a suitable source of power. This rod is arranged to reciprocate inside of a pump liner which receives the piston 3. Some rods are of uniform diameter and receive the piston so that it is locked in position by nuts 4 while others are formed as here shown with a tapered portion 5 thereon which receives the piston so that it is securely wedged in position and held in that position by the nuts 4.

The present piston includes the body or hub 7 which has a tapered opening 8 therein to receive the tapered portion 5 of the rod 2. This hub is usually a metallic structure and is here illustrated as having a flange 10 thereon which projects outwardly from the hub to serve as a support for the packing elements 12 and 13, one of which is disposed about each end of the hub on opposite sides of the flange 10. The connection between the flange and the hub is preferably rounded at 14 and the packings 12 and 13 are similarly formed so that a close contact will be had along the surface 15 of the hub and the surface 16 of the flange.

The packings 12 and 13 are identical and are preferably in the form of annular rings having a flat surface 20 which serve as a base and abut against the faces 16 of the flange. The outer periphery of these packings is preferably concaved slightly from the outer lip 22 toward the base 20 so that the lip 22 is slightly oversized with respect to the inside diameter of the liner in which it is to be confined. In this manner the inherent resiliency of the material 23 of which the packing is made will tend to force the lip 22 against the liner to prevent abrasive particles from flowing beneath the liner so as to ride between the inner surface of the liner and the periphery 21 of the piston.

This packing 12 is preferably made of a resilient material 23 such as natural or synthetic rubber or such other material as may have the desired properties. In view of the fact, however, that this packing is subjected to such enormous pressures, it may be desirable to provide a reenforcing 24 which may be in the form of fabric which is molded with the rubber at the time the packing 12 is formed. It has been found that canvas fabric is most suitable for this purpose and has been illustrated as being confined to an area adjacent the base 20 where the pressure imparted to the packing is transferred to the flange 10. The rings are preferably of the same composition throughout with only the reenforcing material therein as distinguished from some prior pistons having composite hard and soft materials.

The outer end 26 of the packing 12 is conically dished to form a straight annular conical face 27 against a portion of which the fluid pressure is applied during the working stroke.

By providing a straight line face 27 the amount of material present in the packing is uniformly increased so that the flexibility of the packing from the lip 22 is gradually and uniformly decreased as the thickness of the material increases. This may be a desirable feature under some working conditions.

In order to hold this packing member 12 in position a retainer plate 30 has been provided. This plate closely approaches the configuration of the face 27 in that it is a frusto-conical plate which is preferably of uniform thickness. It should be particularly noted, however, that the taper of this plate 30 is different from the taper of the face 27 so that normally there will be an opening 31 between the outer edge 32 of the plate 30 and the end face 27 of the packing. This opening 31 will be observed as gradually decreasing until it disappears entirely at approximately the point 33, where the inner face 34 of the retainer plate comes in contact with the end face 27 of the packing member and for the remainer of the distance extending toward the center of the plate 30 it is in close clamping contact with the face 27 of the packing. This clamp usually holds the packing base 20 firmly against the face 16 of the flange 10 so that there can be no leakage along the inside of the packing and no movement of the packing on the hub.

A particular advantage of this construction is the fact that the space 31 is provided so that on the suction stroke the lip 22 of the packing when subjected to suction can draw down slightly so that the face 27 may move out against the retainer plate 30. Naturally when the piston is moving to the right as viewed in Fig. 1 the packing 12 will be on the suction stroke and it is desirable to have as little friction as possible of the periphery 21 against the liner. Thus, if the packing 12 can move slightly in that area adjacent the lip 22 there will be less drag on the liner and consequently less wear on the packing.

The space 31 provides a limited movement for the outer portion of the packing while the inner portion of the plate 30 holds the packing clamped securely in position.

Another advantage of having the space 31 is that in many instances the packing material 23 and particularly the reenforcing material 24 effects a considerable swelling when it comes in contact with the liquid being pumped. This is particularly true if the pump is permitted to remain idle for some time, or encounters some oil in the liquid being pumped. It being understood that rubber has a great affinity for oil and will absorb oil from the mud being pumped; such absorption, of course, causes swelling of the rubber. The space 31 under these conditions will accommodate a considerable amount of the increase in size of the packing material. If the packing were securely clamped in position with no opportunity for expansion longitudinally it would, of course, create an excessive pressure of the periphery 21 against the liner wall. When sufficient excessive pressure occurs the material of the packing is burned away by frictional contact with the liner when the pump operates and the piston is destroyed or less efficient thereafter.

Figure 2:
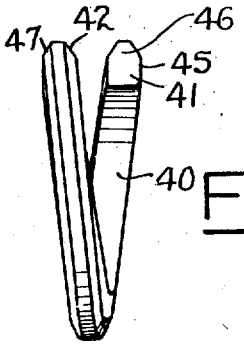
Fig. 2 is a view of one of the locking rings used to hold the packing body and retaining plate in position.

The plate 30 may be locked in position by a clamping or locking ring 40. This ring is best seen in Fig. 2 and is of a spring material having the ends 41 and 42 offset so that it may be readily positioned in the groove 44 which is formed adjacent the end of the hub or body 7. In order to insert this ring the end 41 will be located in the groove 44 and then the ring will be followed around with a tamping tool until the end 42 snaps into position into the groove 44.

It will be observed that this ring 40 is of special configuration in cross-section having flattened sides 45 to engage the sides of the groove 44 and beveled faces at 46 and 47 so that it will form a flat bearing contact with the face 48 of the retainer plate 30. In this manner a maximum locking strength is obtained and the ring 40 may be readily inserted. This ring may be as readily removed by prying one of the ends out of the groove 44 and the ring then snaps out of position so that the plate 30 and the packing may be readily removed.

Figure 3:
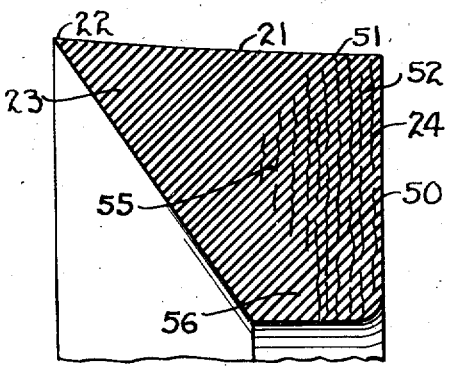
Fig. 3 is a broken sectional view of a slightly modified form of the packing member.

Fig. 3 shows a slightly modified form of the invention wherein the reenforced material 24 is in the form of short strands 50. These short strands are provided so that very few of the strands will have the ends such as 51 exposed on the outer periphery of the packing. Other of the strands such as the strands 52 will be completely imbedded in the resilient material 23 so that such strands will not be exposed to moisture and swell. In order to bring the renforcing material out to the periphery where it is desired, some of the strands may come to the very periphery of the packing but the majority of them will be entirely sealed against moisture.

It seems obvious that when pressure is applied to the piston during the working stroke that there will be a flowing of the resilient material toward the flange 10 and the reenforcing material is so positioned that it will prevent expansion of the packing directly in front of the reenforced flange.

In Fig. 3 the packing material has been arranged in a manner so that it is of greater thickness at the point 55 which approximates about the mid-area of the packing. In this manner that portion of the resilient material at 56 is prevented from expanding outwardly and the lip portion 22 is permitted to be as resilient as possible.

Figs. 4 to 7, inclusive, show modified forms of the piston whereby the expansion or swelling of the packing material may be accommodated.

Figure 4:
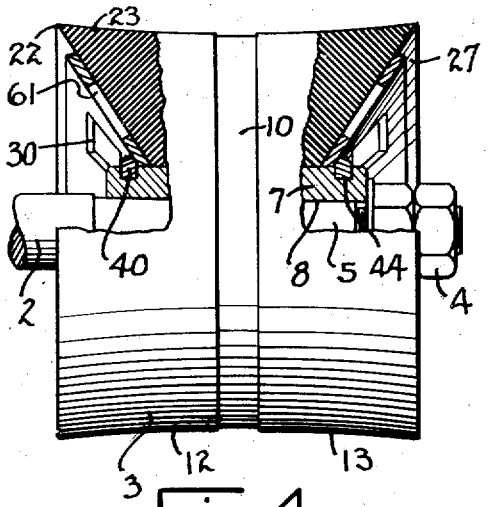
Figs. 4 and 5 are a section and elevation respectively of a modified form of the piston which allows for swelling or expansion of the packing.
Figure 5:
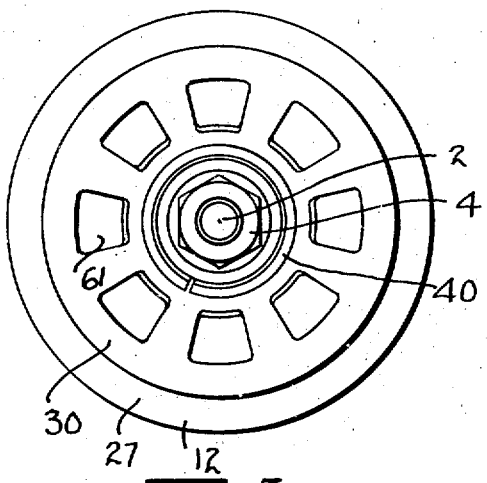

While Fig. 1 shows the allowance for the expansion in the form of a different taper on the packing from the taper on the retaining plates, Fig. 4 shows the plate 30 as being provided with a plurality of openings 61 which are best seen in Fig. 5. In this Fig. 4 form of the invention the plate 30 is shown as abutting closely against the face 27 of the packing member 12 so that it forms a firm contact therewith and retains the packing against the flange 10 at all times, so that it cannot be torn loose from its support on the suction stroke. In event the packing material swells or expands, however, the openings 61 permit this expansion and the packing material will be slightly exuded through these openings so that it will not cause an undue or excessive pressure against the liner wall.

Figure 6:
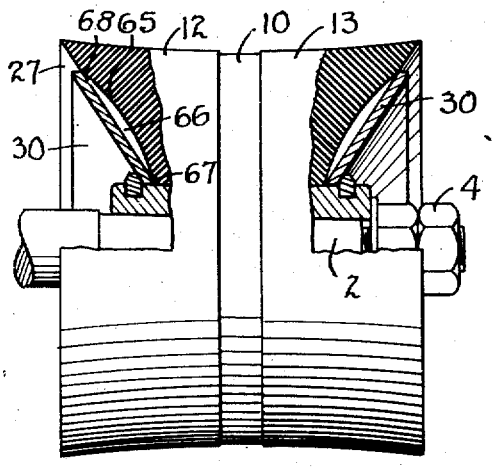

Fig. 6 shows another form of the invention where the plate 30 is also of the same taper as the face 27 of the packing 12. The packing, however, has been hollowed out at 65 in order to form a cavity 66 which is beneath the plate 30 and inside of the circumferential edge thereof. Normally the plate will bear against the packing body at the point 67 and at the point 68 near the outer edge thereof. These two points, or line contacts, will support the packing member sufficiently to hold it in place, but in event of swelling the packing material can move into the cavity 66 and in this manner excessive pressure on the cylinder wall is avoided.

Figure 7:
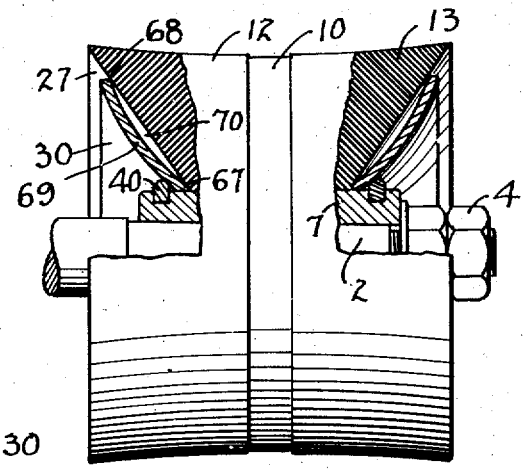
Figs. 6 and 7 are modified sections of two other forms which the invention may take.

Fig. 7 shows another modification wherein the face 27 is a straight conical surface, but the plate 30 has been shown as being concaved at 69 in order to form the cavity 70. This cavity is similar to the cavity 66 in the Fig. 6 form of the invention, but is formed by the curving of the plate rather than the cutting away of the packing material. In this form of the invention the contact with the packing is had at 67 and at 68, the same as in Fig. 6.

In Figs. 4, 6, and 7 the snap ring 40 is utilized to retain the plate in position, the same as is shown in Fig. 1.

Broadly the present invention contemplates the provision of a piston construction wherein oil and water when absorbed by the packing material to cause expansion thereof will not create an undue pressure upon the cylinder walls because the expansion of the packing material is provided for in the various modifications of the invention. It seems obvious, also, that the piston is of advantage because the snap ring 40 can be readily removed and in this manner the plate 30 removed, so that the rubber packing portions can be readily replaced, without removing the core and flange, or the nuts 4, from the piston rod 2. It should be remembered that one of the greatest difficulties in the operation of the slush pump pistons of this type is maintaining the core and hub in rigid position upon the rod 2 so as to avoid leakage or loosening of the piston with respect to the rod. Therefore, if the core can be fixed permanently upon the rod in the shop before the rod is installed in the pump then it is almost certain that no future difficulty will result. If the outer packing member is to be replaced only one snap ring and plate can be removed, whereas if both packing are to be replaced the rod can be removed from its position, but the core and flange need not be molested.

What is claimed is:

1. A piston including a metal body, an outwardly extending rigid rib on said body, a packing member firmly seated on said body and held against flexing by said rib, a concave outer end on said member, a dished retainer plate of an angle different from the concavity of said end and adapted to pass over the end of said body, and means to hold said plate in position.

2. A piston including a metal body, an outwardly extending rigid rib on said body, a packing member seated on said body and supported against movement by said rib, a concave outer end on said member, a dished retainer plate to pass over the end of said body, and means to hold said plate in position, the taper of said member and plate being different to provide an expansion area for said member adjacent the periphery of said plate.

3. In a piston having a rigid packing supporting body, a removable packing ring firmly supported thereon, a conically dished end on said ring, a conically dished retainer plate of a steeper taper than said end and disposed so that said plate abuts said end adjacent the center but is spaced from the end adjacent the periphery.

4. In a piston having a rigid packing supporting body, a removable packing ring seated thereon, a conically dished end on said ring, a conically dished retainer plate of a steeper taper than said end and disposed so that said plate abuts said end adjacent the center but is spaced from the end adjacent the periphery whereby the said packing may move into the space against said plate on the drag stroke of the piston.

5. A piston comprising a rigid body and flange assembly, a packing ring to slip on each end of the body and to abut against said flange to be supported thereby, said ring having a resilient outstanding lip and a reenforced support portion to abut said flange, a conical end on each ring, a conical retainer plate of a different taper than said end, a lock ring to hold said plate to said body, the different tapers of said plate and packing ring providing an annular space between the plate and packing ring so that said packing ring may move into said space when subjected to drag or pressures so that excessive friction on the liner walls will be avoided.

6. A pump piston including a packing ring, a support therefor, means including a plate to retain said ring in operative position on said support, and additional means to allow for swelling of said ring comprising a recess between the end of said ring and plate and into which the packing may flow upon swelling thereof, said recess being formed in the packing ring.

7. A pump piston including a packing ring, a support therefor, means to retain said ring in operative position on said support including a plate and lock ring, and additional means to allow for swelling of said ring comprising a recess between the end of said ring and plate and into which the packing may flow upon swelling thereof, said recess being formed by curving the plate outwardly from the end of the ring.

8. A pump piston including a circular packing ring flaring outwardly toward its end, which flaring portion is adapted to be confined by the pump cylinder to a circular form thereby causing flexing, tending to elongate the ring, a support therefor upon which said ring is firmly seated, means including a plate to retain said ring in firm position on said support, and additional means comprising a portion of said plate shaped to allow for flexing of said ring by providing a recess between a portion of the end of said ring and said plate portion and into which the packing may flow upon flexing thereof.

9. A piston including a rigid metal body, an outwardly extending rigid rib on said body, a packing member seated on said body and against said rib, a conical outer end on said member, a conical retainer plate to pass over the end of said body, and means to hold said plate in position, the inclination of said member and plate being such as to provide an expansion area for said member adjacent the periphery of said plate.

DUDLEY C. SHARP.
RANALD M. GARRISON.